US006560233B1

(12) United States Patent
Hatanaka et al.

(10) Patent No.: US 6,560,233 B1
(45) Date of Patent: May 6, 2003

(54) DATA PROCESSING APPARATUS AND NETWORK RELAYING APPARATUS

(75) Inventors: Satoshi Hatanaka, Hadano (JP); Nobuhito Matsuyama, Hadano (JP); Kazuo Sugai, Ebina (JP); Yukisada Yamakawa, Hadano (JP)

(73) Assignees: Hitachi, Ltd., Tokyo (JP); Hitachi Information Technology Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/266,635

(22) Filed: Mar. 11, 1999

(30) Foreign Application Priority Data

Mar. 12, 1998 (JP) ............................................ 10-061732

(51) Int. Cl.[7] ............................................... H04J 12/26
(52) U.S. Cl. ....................................... 370/401; 370/466
(58) Field of Search ................................ 370/392, 412, 370/389, 401, 428, 429, 466, 467, 465, 469; 709/238

(56) References Cited

U.S. PATENT DOCUMENTS

| 5,465,331 A | * | 11/1995 | Yang et al. .................. 709/244 |
| 5,640,599 A | * | 6/1997 | Roskowski et al. ........... 710/29 |
| 5,938,736 A | * | 8/1999 | Muller et al. ............... 370/392 |
| 5,978,951 A | * | 11/1999 | Lawler et al. ............... 370/392 |
| 6,032,190 A | * | 2/2000 | Bremer et al. .............. 709/238 |
| 6,160,809 A | * | 12/2000 | Adiletta et al. ............. 370/392 |
| 6,172,990 B1 | * | 1/2001 | Deb et al. ................... 370/466 |

* cited by examiner

*Primary Examiner*—Wellington Chin
*Assistant Examiner*—William Schultz
(74) *Attorney, Agent, or Firm*—Mattingly, Stanger & Malur, P.C.

(57) ABSTRACT

Each of a plurality of data processing units that form a network relaying apparatus has a memory controller, a network controller, a processor, and independently accessible first and second memories. The memory controller includes a header information register for storing header information such as a header start position in a packet and a header length; a header position detection circuit for detecting a header position in the packet based on the header information contained in the header information register; and an inter-data processing unit transfer circuit for sending and receiving a packet to and from another data processing unit. The data processing unit stores into the first memory a packet received from the network or a packet transferred from another data processing unit, and at the same time stores only a header portion of the packet into the second memory. The processor reads the header portion of the packet from the second memory and analyzes it while at the same time the network controller and the inter-data processing unit transfer circuit write and read another packet to and from the first memory.

9 Claims, 6 Drawing Sheets

(a) ETHERNET FRAME

(b) MAC HEADER (14 BYTES)

(c) IP HEADER, TCP HEADER (d) IP HEADER (20 BYTES)

(e) TCP HEADER (20 BYTES)

FIG.4

(a) FDDI FRAME (b) MAC HEADER (14 BYTES)

(c) LLC HEADER, IP HEADER, TCP HEADER

DATA PROCESSING APPARATUS AND NETWORK RELAYING APPARATUS

BACKGROUND OF THE INVENTION

1. Field of the Invention

The present invention relates to a data processing unit used as a constitutional element of a network relaying apparatus, such as router and bridge, and a network relaying apparatus applying the data processing unit.

2. Description of Related Art

A data processing unit used as a constitutional element of a network relaying apparatus such as a router and a bridge generally includes a memory for storing received packets or packets to be transmitted, a memory controller for controlling reading from and writing into the memory and for controlling transfer of packets to and from another data processing unit connected to another network, a network controller for transferring packets received from a network to the memory via the memory controller and for sending packets, that were retrieved from the memory via the memory controller, to the network, and a processor for retrieving a header portion of a packet, analyzing it and, depending on the result of the analysis, issuing a request to the memory controller or the network controller to retrieve the packet from the memory and transfer it to another data processing unit or network.

In such a data processing unit, various processing, including the processing to transfer a packet between the network controller and the memory, the processing for the processor to read a packet header portion from the memory, and the processing to read a packet from the memory for transfer to another data processing unit, occur independently of each other. This gives rise to a problem of conflict among memory accesses made by these processing, which constitutes the most serious factor that hampers an increased speed. To alleviate the access contention, it is common practice to use a high-speed memory device or a special memory device (dual port memory) that allows independent parallel accesses by the processor and the network controller.

SUMMARY OF THE INVENTION

With data transmission speeds of networks increasing in recent years, a data processing unit used in a network relaying apparatus such as a router and a bridge is required to increase the speed of processing, including the processing of a network controller for reading the sending packets from memory and writing the received packets into memory. It is also necessary to avoid performance degradation caused by memory access conflicts between a network controller and a processor. To this end, the data processing unit in a conventional network relaying apparatus is required to limit the number of network controllers that can be mounted in the apparatus. Alternatively, it is necessary to use a high-speed memory device or a dual port memory device that allows independent accesses from the processor and the network controller. There are problems with these countermeasures, however. The former limits the number of networks that can be connected to the network relaying apparatus while the latter raises cost as it requires an expensive memory.

An object of the present invention is to provide a data processing unit that improves the packet processing capability by minimizing a conflict of accesses to memory where packets are stored, without limiting the number of network controllers that can be mounted in the apparatus, and also to provide a network relaying apparatus that uses such a data processing unit as its constitutional element.

Another object of the present invention is to provide a data processing unit that improves the packet processing capability by minimizing a conflict of accesses to memory where packets are stored, without using an unnecessarily high-speed memory device or a dual port memory device, and also to provide a network relaying apparatus that uses such a data processing unit as its constitutional element.

To achieve the above objectives, this invention provides, in addition to a memory (first memory) in which to store packets received from a network or packets transferred from another data processing unit, a memory (second memory) that can be accessed independently of the first memory and in which a header portion of a packet is stored (or copied) at the same time that the packet is stored in the first memory. The processor stores the header portion of a packet into the second memory and references the header portion stored in the second memory to analyze the packet header portion. The network controller writes and reads packets into and from the first memory independently of the processor that performs the header analyzing processing.

As a result, the header analyzing processing on a packet and the transfer processing on another packet can be performed parallelly. This prevents a system performance degradation that would otherwise be caused by a conflict of accesses to a packet storing memory. This in turn alleviates the limitations imposed by the performance degradation on the number of network controllers that can be used in the system. It is therefore possible to use a memory device with a somewhat slow cycle time or a single port.

DETAILED DESCRIPTION OF EMBODIMENTS

Now, a system according to one embodiment of this invention will be described by referring to the accompanying drawings.

Figure 1:
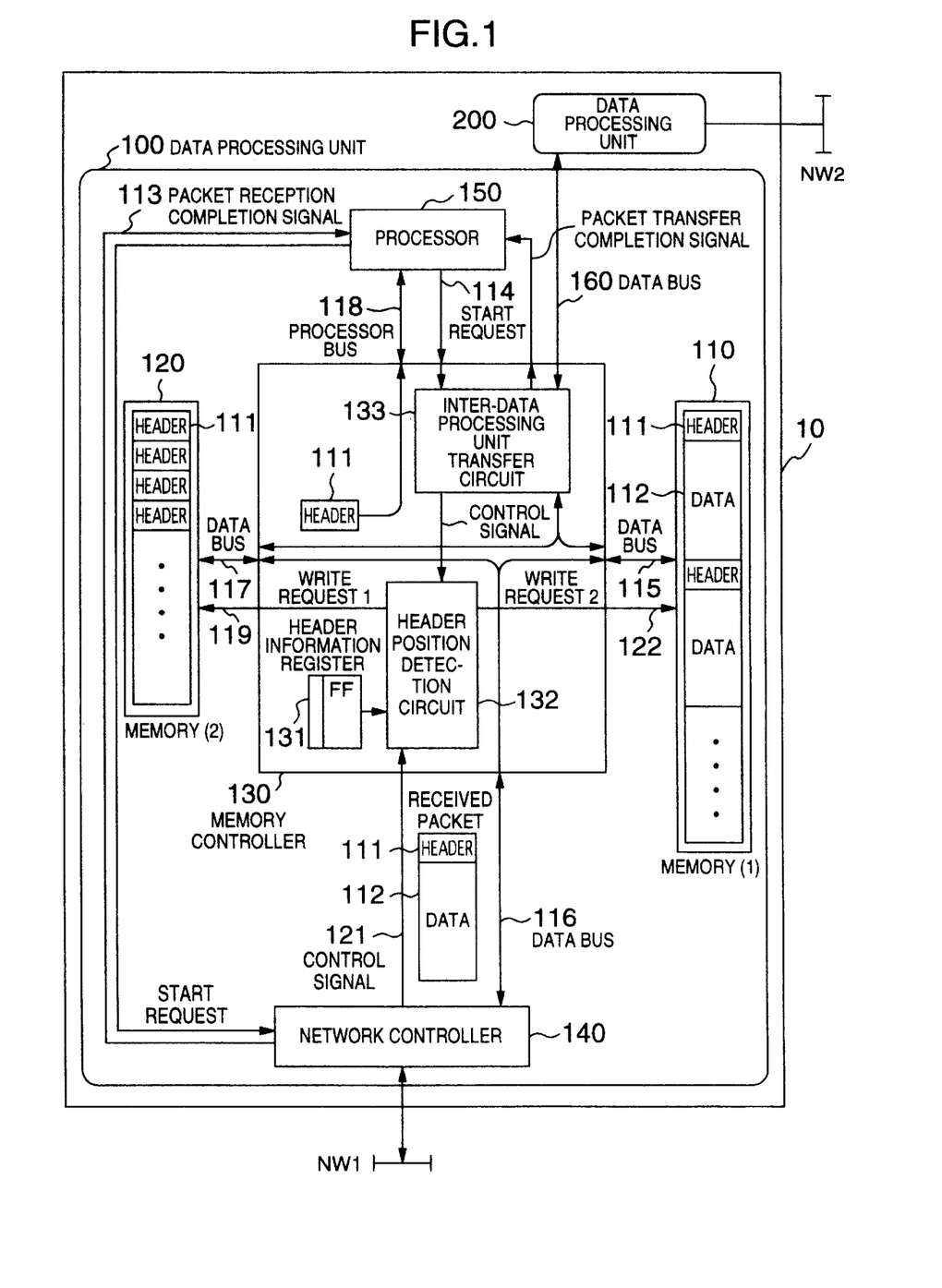
FIG. 1 is a block diagram showing a configuration of a data processing unit according to one embodiment of this invention.

FIG. 1 is a block diagram showing a data processing unit according to one embodiment of this invention and a router or bridge that uses the data processing unit. In FIG. 1, reference numeral 10 represents a router or bridge that has data processing units 100 and 200. The data processing unit 100 is connected to a network NW1 and the data processing unit 200 to another network NW2, with an internal bus 160 interconnecting these two data processing units 100, 200. The data processing units 100, 200 each send and receive packets to and from the networks NW1, NW2 and transfer packets between them via the internal bus 160 as required. The configurations of the data processing units are basically equal and thus only the data processing unit 100 will be detailed in the following.

In the data processing unit 100, a network controller 140 is an LSI that controls transmission and reception of packets to and from the network NW1. When the apparatus is connected to a host or a terminal, an I/O controller is used instead of the network controller. Here they are generally referred to network controllers. A memory (1) 110 stores packets received from the network NW1 and packets to be transmitted to the network NW1. A memory (2) 120 stores header portions of packets received from the network NW1 and header portions of packets to be transmitted to the network NW1. The memory (1) 110 may, for example, use an SDRAM (Synchronous Dynamic Random Access Memory) and the memory (2) 120 an SRAM (Static Random Access Memory). A memory controller 130 is an LSI located between the network controller 140 and a processor 150 and between the memory (1) 110 and the memory (2) 120 to perform controls, such as storage and reading of packets and packet header portions, between the network controller 140 or processor 150 and the memories 110, 120. The memory controller 130 includes a header information register 131 for storing header information such as a header start position in a packet and a header length, a header position detection circuit 132 for detecting a header position in a packet based on the header information contained in the header information register 131, and an inter-data processing unit transfer circuit 133 for sending and receiving packets to and from another data processing unit 200. Other circuit configurations in the memory controller 130 are not directly related to this invention and their explanations are therefore omitted. The processor 150 is an LSI that performs such operations as controlling the start of and monitoring the status of the network controller 140, retrieving a packet header portion from the memory (2) 120, and sending a startup request to the inter-data processing unit transfer circuit 133.

Figure 2:
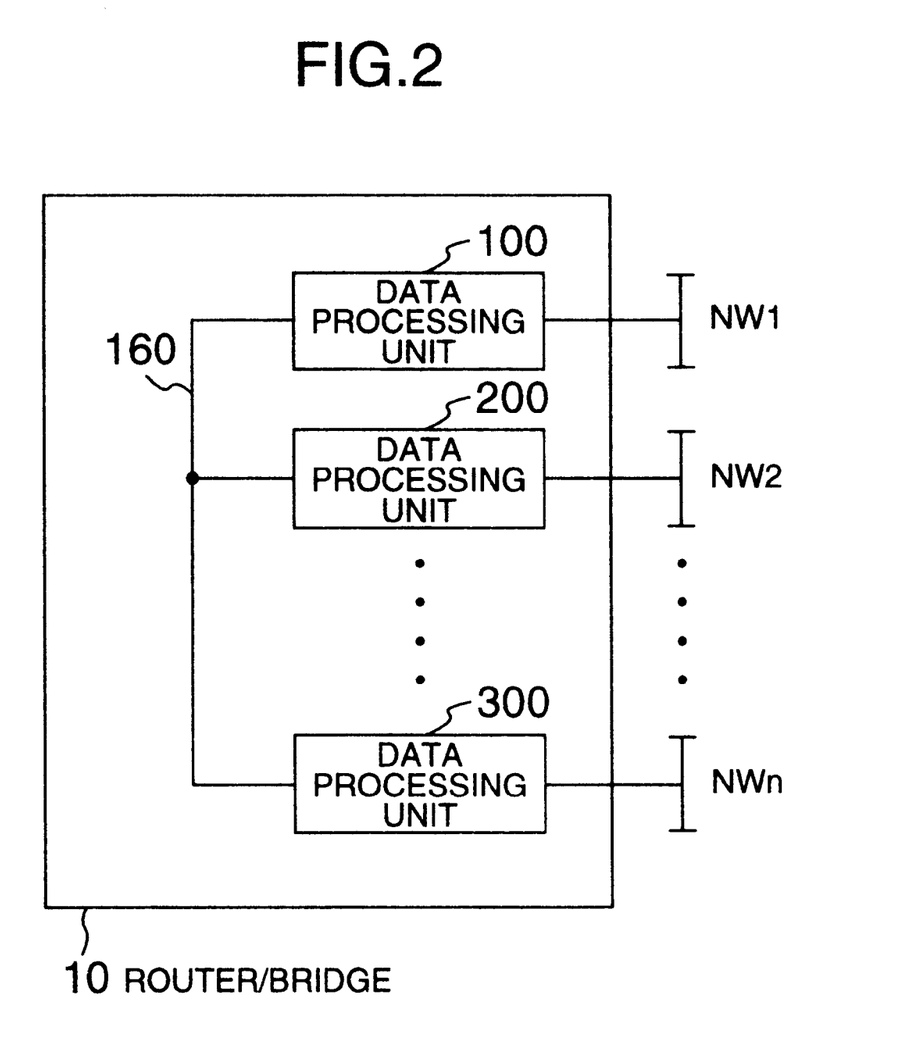
FIG. 2 is a general configuration of a network relaying apparatus that applies the data processing unit.

Although FIG. 1 shows only two data processing units 100, 200, the system may have three or more data processing units 100, 200, 300 interconnected by the internal bus 160 to form a router or bridge 10 that matches three or more networks, as shown in FIG. 2. Each of the data processing units generally has two or more network controllers 140. While in this embodiment the network controllers 140 are included in the data processing unit, they may be formed separate from the data processing unit.

Figure 3:
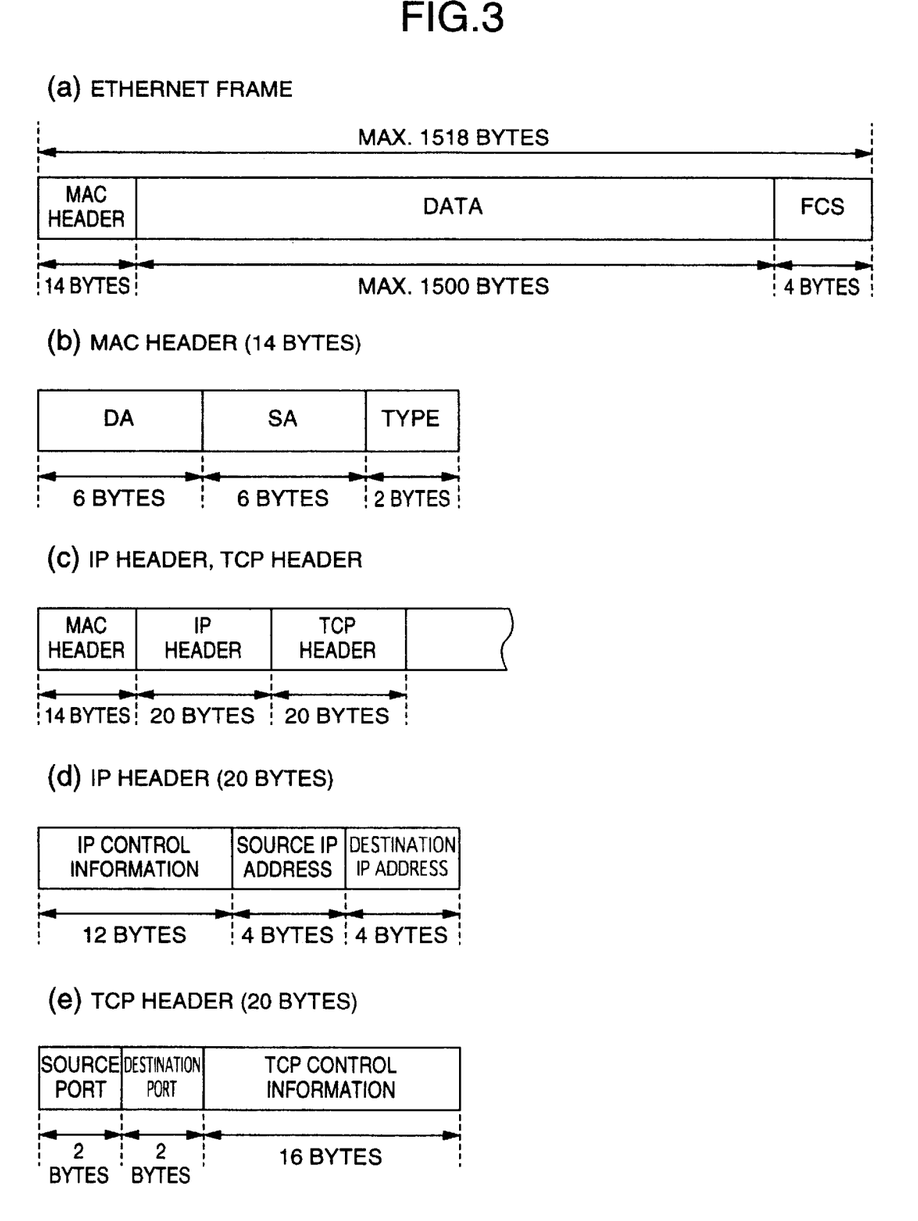
FIG. 3 shows the example structures of packet formats.
Figure 4:
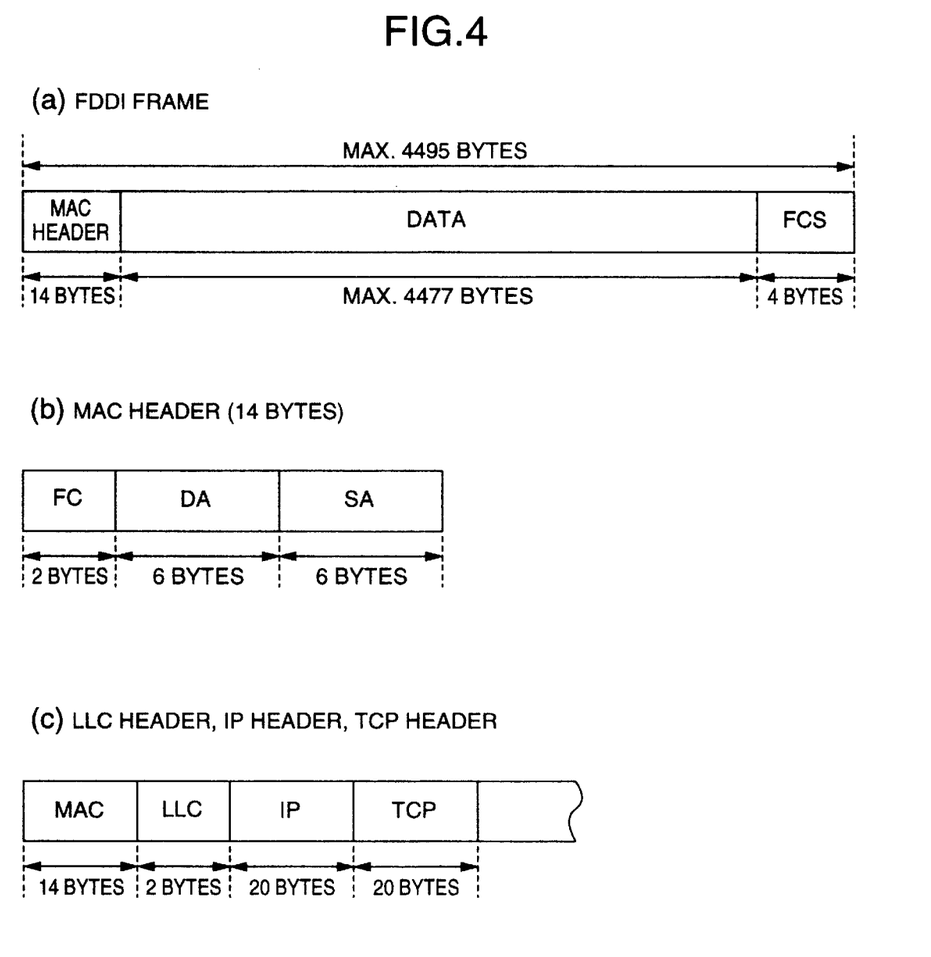
FIG. 4 shows other example structures of packet formats.

First, let us explain about the format of a packet. The packet comprises a header portion 111 and a data portion 112. The memory (1) 110 stores both of the header portion 111 and the data portion 112 of the packet while the memory (2) 120 stores only the header portion 111 of the packet. FIGS. 3 and 4 show example frame structures of a packet.

FIG. 3 show an example of a packet format (referred to as an Ethernet frame) for Ethernet, a commonly used LAN. The Ethernet frame has a maximum of 1518 bytes (1 byte=8 bits), with the first 14 bytes used as an MAC header followed by a data portion and an FCS (frame check sequence) for detection of frame errors ((a) of FIG. 3). The MAC header consists of a destination address (DA), a source address (SA) and a frame type ((b) of FIG. 3). An IP header and a TCP header are arranged in that order at the beginning of the data portion following the MAC header in the frame ((c) of FIG. 3). The IP header has IP control information, a source IP address and a destination IP address ((d) of FIG. 3), and the TCP header has a source port, a destination port and TCP control information ((e) of FIG. 3). FIG. 3(*d*) represents an example of IPv4 (version 4) and, in the case of IPv6, the IP address length is 16 bytes.

FIG. 4 shows an example frame structure of a packet format (referred to as an FDDI frame) for an FDDI network employed in trunk networks. The FDDI frame has a maximum of 4495 bytes, with the first 14 bytes used as a MAC header followed by a data portion and an FCS as in the Ethernet frame ((a) of FIG. 4). The MAC header comprises a frame type (FC: Frame Control), a destination address (DA) and a source address (SA) ((b) of FIG. 4). While in the Ethernet frame the IP header follows the MAC header at the beginning of the data portion, the FDDI frame has, after the MAC header, an LLC header for identifying a source/destination protocol ((c) of FIG. 4). The structures of the IP header and the TCP header are the same as those of the Ethernet frame.

The header information register 131 in FIG. 1 needs to be set with header information whose value varies according to the kind of network to which the apparatus is connected (such as Ethernet and FDDI) and the kind of apparatus employed (such as a bridge and a router). In the case of the packet formats of FIG. 3 and FIG. 4, the set values of the header information (header start position and header length) are as follows:

(1) When the Network to Which the Apparatus is Connected is Ethernet

① The apparatus employed is a bridge: A case where the MAC address (the processor uses the source address and the destination address for the decision) is used for the detection and the header is written.

Header start position: "1" is set (the header is written beginning with the first byte of a packet).

Header length: "12" is set (both of the source MAC address (6 bytes) and the destination MAC address (6 bytes) are written).

② The apparatus employed is a router: A case where the IP address (the processor uses the source IP address and the destination IP address for the decision) is used for the detection and the header is written.

Header start position: "27" is set (the header is written following the MAC header (14 bytes)+the IP control information (12 bytes)).

Header length: "8" is set (both of the source IP address (4 bytes) and the destination IP address (4 bytes) are written).

(2) When the network to Which the Apparatus is Connected is FDDI

① The apparatus employed is a bridge: A case where the MAC address is used for the detection and the header is written.

Header start position: "3" is set (the header is written following the FC (2 byes)).

Header length: "12" is set (both of the source MAC address and the destination MAC address are written).

② The apparatus employed is a router: A case where the IP address is used for the detection and the header is written.

Header start position: "35" is set (the header is written following the MAC header (14 bytes)+the LLC header (8 bytes)+the IP control information (12 bytes)).

Header length: "8" is set (both of the source IP address and the destination IP address are written).

Next, the operation of the data processing unit of FIG. 1 will be described. It is assumed that the header information register 131 is already set by the processor 150 with header information (header start position and header length) depending on the kind of network to which the apparatus is connected and the kind of apparatus employed. Normally, this header information is set based on a configuration definition information when a router/bridge is set up.

The network controller 140, when it receives a packet from the network NW1, causes a control signal 121 to be "1", informing the header position detection circuit 132 of the memory controller 130 that the received packet has been output on a data bus 116. When the control signal 121 is "0", this indicates that a received packet is not output on the data bus 116. In this embodiment, the data bus 116 passes through the memory controller 130 and connects directly to a data bus 115 that actually connects to the memory (1) 110 and directly to a data bus 117 that actually connects to the memory (2) 120.

The header position detection circuit 132 of the memory controller 130 incorporates a received packet byte counter and starts the received packet byte counter when it recognizes that the control signal 121 is "1". When the count value (a position in a packet currently being received) coincides with a header start position set in the header information register 131, the header position detection circuit 132 causes a data write request 1 signal 119 for the memory (2) 120 to be "1". With the write request 1 signal 119 set to "1", the data output on the data bus 117 is written into the memory (2) 120. When the write request 1 signal 119 is "0", the data is not written into the memory (2) 120. Then, when the count value of the received packet byte counter coincides with the header start position plus the header length, both set in the header information register 131, the header position detection circuit 132 causes the write request 1 signal 119 to go to "0", terminating the writing into the memory (2) 120. Because in this embodiment the data bus 117 connected to the memory (2) 120 and the data bus 116 connected to the network controller 140 are directly connected with each other, the packets received by the network controller 140 are successively output as is to the data bus 117. Thus, by controlling only the write request 1 signal 119, only a desired header portion of the received packet can be written into the memory (2) 120.

Further, when the header position detection circuit 132 recognizes that the control signal 121 becomes "1" after the received packet has been output on the data bus 116, it sets a write request 2 signal 122 to "1" causing the received packet to be written into the memory (1) 110 through the data-bus 115. Then, when the whole received packet has been stored into the memory (1) 110, the write request 2 signal 122 is set to "0".

When the received packet has been completely output on the data bus 116, the network controller 140 sets to "1" a packet reception completion signal 113 for the processor 150. If the output is not completed, the packet reception completion signal 113 remains "0".

The processor 150 that has detected "1" of the packet reception completion signal 113 reads a header portion 111 of the received packet from the memory (2) 120 through the memory controller 130 by using a processor bus 118. The processor 150 analyzes the header portion 111 and, according to the contents of a routing table/filtering database (not shown), decides whether or not the received packet should be transferred. When the received packet needs to be transferred to another data processing unit 200, the processor 150 sets to "1" a start request signal 114 for the inter-data processing unit transfer circuit 133 in the memory controller 130. When the start request is not made to the inter-data processing unit transfer circuit 133, the start request signal 114 is "0". The inter-data processing unit transfer circuit 133, when it detects "1" state of the start request signal 114, reads the received packet stored in the memory (1) 110 and transfers it to the data processing unit 200 via the internal bus 160. The data processing unit 200 performs storage and analysis on the transferred packet in the same way as in the data processing unit 100 and then transmits the packet to the network NW2 for example.

While the above description concerns the operation of the apparatus of FIG. 1 when it receives a packet from the network NW1, the operation performed when a packet is transferred from another data processing unit 200 through the internal bus 160 is basically the same if the network controller 140 is replaced with the inter-data processing unit transfer circuit 133. This is briefly explained as follows.

When a packet is transferred from another data processing unit 200 via the internal bus 160, the inter-data processing unit transfer-circuit 133 causes the control signal for the header position detection circuit 132 to be "1". The header position detection circuit 132 stores the packet output from the inter-data processing unit transfer circuit 133 into the memory (1) 110 and at the same time, according to the header information in the header information register 131, stores a desired header portion of the packet into the memory (2) 120. When the packet transfer is completed, the inter-data processing unit transfer circuit 133 sets to "1" a packet transfer completion signal for the processor 150. The processor 150 reads the packet header portion from the memory (2) 120 using the processor bus 118 and analyzes the header portion and, if it is found that the packet needs to be transmitted to the network NW1, the processor 150 causes the start request signal for the network controller 140 to be "1". The network controller 140 then reads the packet from the memory (1) 110 through the memory controller 130 and sends it to the network NW1.

In a configuration in which the data processing unit 100 has two network controllers 140 each connected to a different network, the destination, to which a packet received from a network connected to one network controller is to be transferred, may be a network connected to the other network controller. When the processor detects such a situation based on the result of analysis of the packet header, the processor issues a packet send request to the network controller connected to the destination network.

In this embodiment, while the processor 150 reads the packet header portion from the memory (2) 120 through the memory controller 130, the memory (1) 110 is not used by the processor 150 and therefore allows accesses from the network controller 140 and the inter-data processing unit transfer circuit 133 for packet transmission or transfer while preventing a conflict with the processor 150 in accessing the memory (1) 110.

Figure 5:
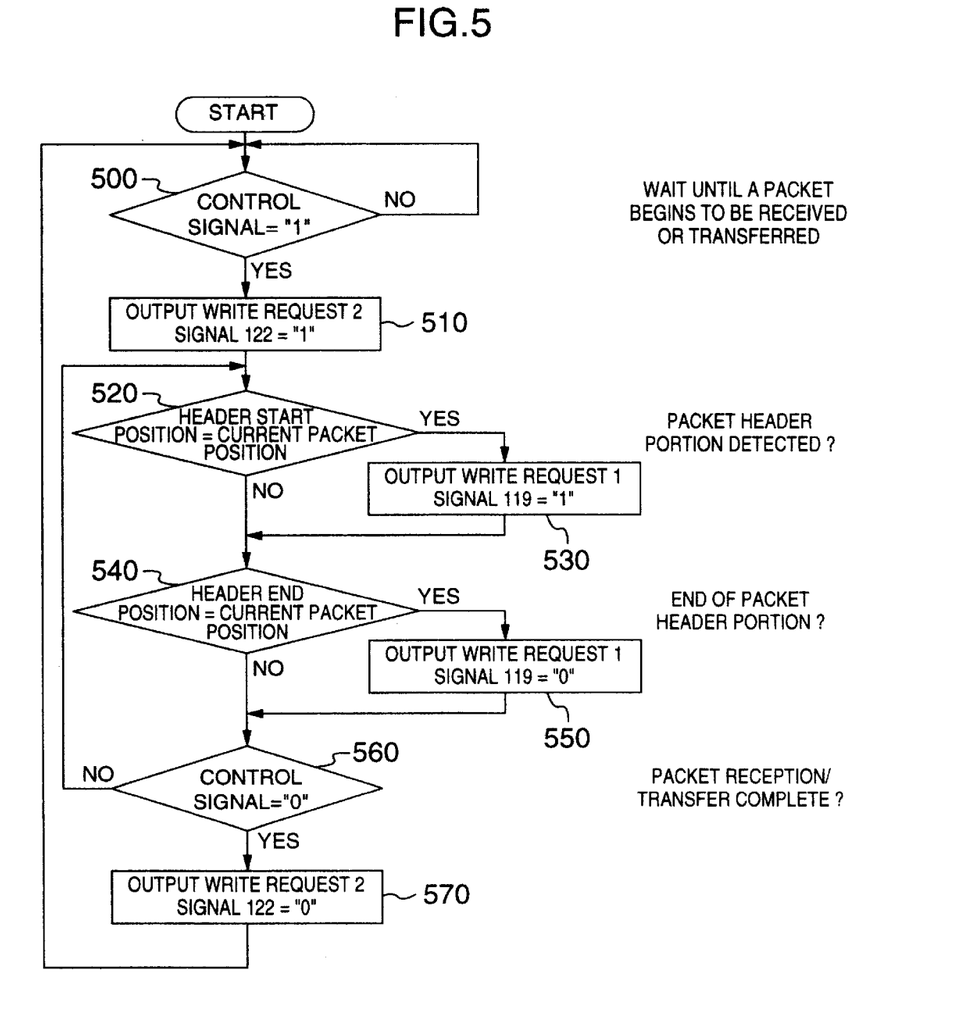
FIG. 5 is an example operation flow of a header position detection circuit of FIG. 1.

FIG. 5 shows an example flow of operation performed by the header position detection circuit. First, a step 500 checks the control signal that indicates whether a packet has been received or transferred from the network controller 140 or the inter-data processing unit transfer circuit 133. This control signal, when it is "0", indicates that the packet reception or transfer operation is not being performed. The loop of the step 500 is repeated until the packet is received or transferred. When the control signal 1 goes to "1", this indicates that the packet reception or transfer operation is being performed and the processing moves to a step 510.

The step 510 causes the write request 2 signal 122 to go to "1". With the write request 2 signal set to "1", the packet begins to be stored into the memory (1) 110 through the memory controller 130. This processing of storing the packet into the memory (1) 110 is executed until the write request 2 signal 122 goes to "0" at a step 570.

Next, at a step 520 a comparison is made between a header start position value set beforehand in the header information register 131 and a position in the packet being received or transferred that is counted from the beginning of the packet (referred to as a current packet position). The header start position represents a start position of what is to be detected as a header portion in the packet as counted from the beginning of the packet. When at the step 520 the header start position matches the current packet position, the processing moves to a step 530. When they do not agree, the processing proceeds to a step 540. The step 530 sets the write request 1 signal 119 to "1" and the processing moves to the step 540. Setting the write request 1 signal 119 to "1" causes only the header portion of the packet to begin to be stored into the memory (2) 120. The step 540 compares a header end position value with the present position in the packet as counted from the beginning of the packet being received (current packet position). The header end position represents an end position of what is to be detected as a header portion in the packet as counted from the beginning of the packet, and is determined by adding a header length to the header start position value, both set in the header information register 131. When the header end position and the current packet position agree at the step 540, then the processing proceeds to a step 550. If not, it proceeds to a step 560. Executing the step 520 and step 540 determines at which position in a packet a desired header is located with respect to the beginning of the packet being received or transferred. When the header end position and the current packet position agree, the step 550 sets the write 1 signal 119 to "0" before proceeding to a step 560. By setting the write request 1 signal 119 to "0" the storing of only the desired header portion of a packet into the memory (2) 120 is ended.

The step 560 checks whether or not the control signal from the network controller 140 or the inter-data processing unit transfer circuit 133 is "0". When the control signal is found to be "1", it indicates that the reception or transfer of a packet is finished. When the control signal is "1", this means that the reception or transfer of a packet is still underway. When the control signal 121 is "1", the step 520 and subsequent steps are executed again. When the control signal 121 is "0", the processing proceeds to a step 570 where the write request 2 signal 122 is held "0" to stop storing the packet into the memory 110.

Then, the processing moves unconditionally to a step 500 where it waits for the next packet to be received or transferred. When a packet is received or transferred, the processing involving the step 510 and subsequent steps is executed again.

Figure 6:
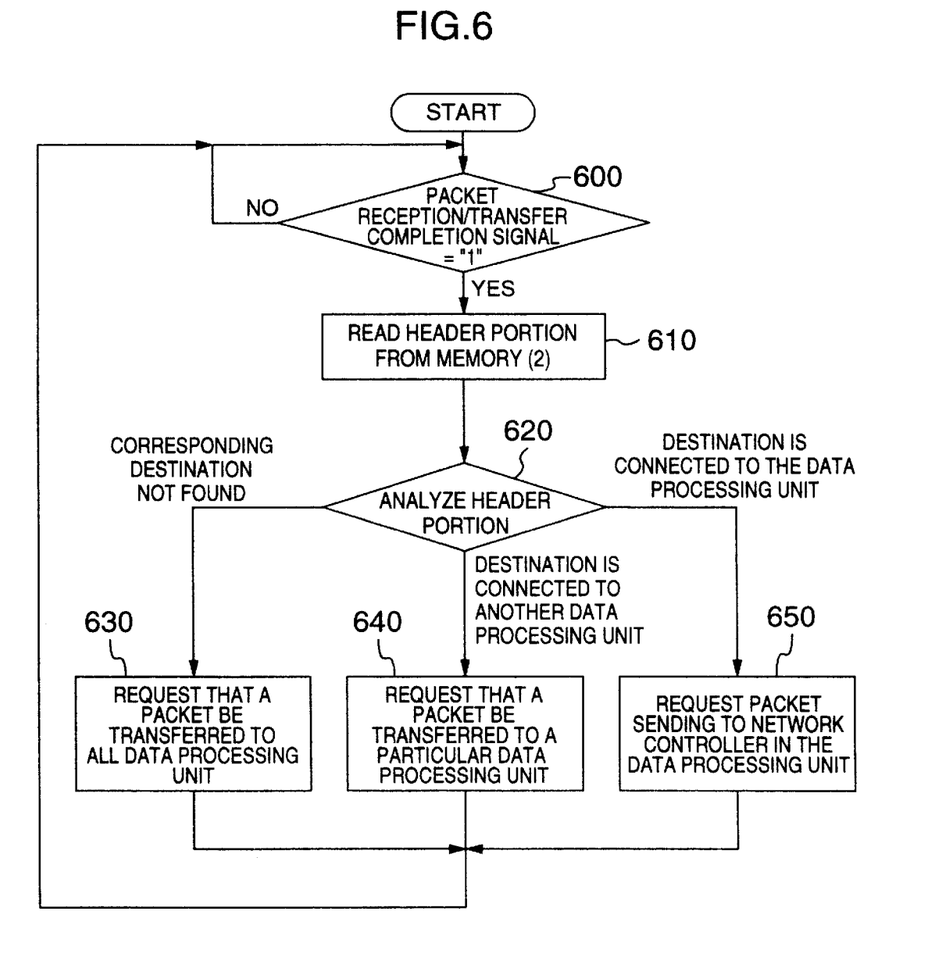
FIG. 6 is an example operation flow of a processor of FIG. 1.

FIG. 6 shows an example flow of operation performed by the processor 150. First, a step 600 checks whether or not a packet reception completion signal from the network controller 140 or a packet transfer completion signal from the inter-data processing unit transfer circuit 133 (both referred to as a packet reception/transfer completion signal) is "1". While the packet reception/transfer completion signal is "0", this indicates that no packet is received from a network or transferred from another data processing unit and the processing loops the step 600. When the packet reception/transfer completion signal goes to "1", this indicates that a packet has been received from a network or transferred from another data processing unit and the processing moves to a step 610. At this time the received or transferred packet is stored in the memory (1) 110 and a desired header portion of the packet in the memory (2) 120. The step 610 reads the desired header portion of the packet from the memory (2) 120 through the memory controller 130 by using the processor bus 118.

Next, a step 620 analyzes the header portion thus read in and checks a destination of the packet (another data processing unit, network, etc.) In more concrete terms, the destination decision is made by searching through a routing table provided in the processor 150 according to an address in the header portion read in. The processing proceeds to step 630, 640 or 650 depending on the result of analysis of the header portion.

The step 630 represents a case where the destination of the received packet is not connected to a particular data processing unit. In this case, the processor requests the inter-data processing unit transfer circuit 133 to transfer the received packet of interest stored in the memory (1) 110 to all the data processing units. The step 640 represents a case where the destination of the received packet is connected to another particular data processing unit. In this case, the processor requests the inter-data processing unit transfer circuit 133 to transfer the received packet of interest stored in the memory (1) 110 to only the corresponding data processing unit. The step 650 represents a case where the destination of the received or transferred packet is connected to a network controller within the data processing unit. In this case, the processor requests the network controller within the data processing unit to send the packet of interest stored in the memory (1) 110.

After executing the step 630, 640 or 650, the processing proceeds unconditionally to the step 600 where it waits for the packet reception/transfer completion signal to go to "1". When the packet reception/transfer completion signal becomes "1", the processing executes the step 610 and subsequent steps.

One embodiment of the invention has been described. The header information set in the header information register 131 may be a combination of a header start position and a header end position, with the header end position calculated beforehand from the header start position and the header length by the processor 150. In this case, the adding function of the header position detection circuit can be eliminated.

Further, while the embodiment does not describe the configuration of the storage areas of the memory (1) 110 and the memory (2) 120, it is possible to separate a storage area for storing packets received from the network controller and their header portions and a storage area for storing packets transferred from the inter-data processing unit transfer circuit and their header portions. This configuration facilitates the management of the packets.

While, in the router/bridge of the embodiment, a plurality of the data processing units are interconnected by an internal bus, they may be connected by a switch mechanism such as crossbar switch. Further, the router/bridge may have only one data processing unit that has a plurality of network controllers each connected to a different network.

Furthermore, although the embodiment concerns the router or bridge, this invention can of course be applied to a network relaying apparatus that is connected to a plurality of networks to relay packets.

What is claimed is:

1. A network relaying apparatus connected to a plurality of networks to relay a packet received from one network to another network, comprising:

a plurality of network controllers each connected to one of the plurality of the networks;

a plurality of data processing units; and connecting means for connecting the plurality of the data processing units;

wherein each of the plurality of the data processing units is connected to one of the plurality of the networks through one of the plurality of the network controllers, and has a first memory for storing a first packet received from the network through the network controller and a second memory for storing a header portion of the first packet, the second memory being accessible independently of the first memory;

each of the plurality of the data processing units further comprises a processor, a memory controller and a transfer unit, the processor controls operations of the network controller, the memory controller and the transfer unit, and the memory controller stores the first packet received through the network controller into the first memory, detects a position of the header in the first packet, and stores the header of the first packet into the second memory;

the memory controller includes memory means for storing header information depending on a network type connected to the data processing unit, and the memory controller detects the position of the header of the first packet based on the header information;

the processor references the second memory to analyze the header of the stored first packet and determine a transfer destination of the stored first packet;

the transfer unit transfers a second packet stored in the first memory, said second packet having a transfer destination determined to be another network connected with another one of the data processing units, to said another one of the data processing units via the connecting means; and wherein the determination of the transfer destination of the stored first packet by the processor and the transfer of the second packet by the transfer unit are performed in parallel.

2. A network relaying apparatus according to claim 1, wherein each of the plurality of network controllers is a constitutional element making up the plurality of the data processing units.

3. A network relaying apparatus according to claim 1, wherein each of the plurality of data processing units, when the result of the analysis shows a transfer destination of the second packet to be another network connected to the data processing unit, issues a request for sending the second packet to a network controller connected to the other network.

4. A network relaying apparatus according to claim 1, wherein the network relaying apparatus is a router.

5. A network relaying apparatus according to claim 1, wherein the network relaying apparatus is a bridge.

6. A network relaying apparatus connected to a plurality of networks to relay a packet received from one network to another network, comprising:

a plurality of network controllers each connected to one of the plurality of the networks;

a plurality of data processing units; and connecting means for connecting the plurality of the data processing units;

wherein each of the plurality of the data processing units is connected to one of the plurality of the networks through one of the plurality of the network controllers, has a first memory for storing a packet received from the network through the network controller and a second memory for storing a header portion of the received packet, the second memory being accessible independently of the first memory, and references the second memory to analyze the header of the received packet and determine a transfer destination of the received packet;

wherein each of the plurality of the data processing units further comprises a processor and a memory controller, the processor controls operations of the network controller and the memory controller, and the memory controller stores the packet received through the network controller into the first memory and at the same time detects a position of the header in the received packet and stores the header into the second memory; and wherein a data signal line for sending a packet from the network controller to the memory controller is directly connected through the memory controller to a data signal line extending from the memory controller to the first memory and to a data signal line extending from the memory controller to the second memory.

7. In a network relaying apparatus which includes a plurality of data processing units each connected to a different network and connecting means for interconnecting the plurality of the data processing units and which relays a packet received from one network to another network, a packet transfer method in each of the plurality of the data processing units comprising the steps of:

storing a received first packet into a first memory;

storing a header portion of the first packet into a second memory, the second memory being able to be accessed independently of the first memory; and referencing the second memory and analyzing the header of the stored first packet to determine a transfer destination of the stored first packet;

transferring a second packet stored in the first memory, said second packet having a transfer destination determined to be another network connected with another one of the data processing units, to said another one of the data processing units via the connecting means, the second packet transfer being performed in parallel with the stored first packet transfer destination determination, wherein in each of the plurality of data processing units, when the first packet is stored into the first memory, a position of the header in the first packet is detected and the header of the first packet is stored into the second memory; and wherein the position of the header of the first packet is detected based on the header information that depends on a network type connected to the data processing unit.

8. A packet transfer method according to claim 7, wherein the plurality of data processing units, when the result of the analysis shows a transfer destination of the second packet to be another network connected to the data processing unit, sends the second packet to the other network.

9. A network relaying apparatus connected to a plurality of networks to relay a packet received from one network to another network, comprising:

a plurality of network controllers, each connected to one of the plurality of the networks, for receiving and sending packets;

a plurality of data processing units each connected to at least one of the plurality of networks through one of the network controllers; and a connection unit for inter-connecting among the plurality of the data processing units;

each of the data processing units including:

a first memory for storing a first packet received by the network controller;

a second memory, accessible independently of the first memory, for storing a header portion of the first packet;

a writing unit for receiving the first packet from the network controller and writing the first packet into the first memory while writing the header portion of the first packet into the second memory;

a memory unit for storing header information corresponding to a network type connected to the data processing unit through the network controller, a processing unit for reading out the packet header of the stored first packet from the second memory and determining a destination of the stored first packet by analyzing the packet header of the stored first packet; and a transfer unit for transferring a second packet stored in the first memory, the second packet having a transfer destination determined to be another network connected with another one of the data processing units, to the another one of the data processing units via the connection unit, the second packet transfer being performed in parallel with the first packet transfer destination determination, wherein the writing unit counts bytes of the first packet received from the network controller and detects the header portion of the first packet based on the count value and the header information in the memory unit.

* * * * *